(12) United States Patent
Ukawa

(10) Patent No.: US 7,446,835 B2
(45) Date of Patent: Nov. 4, 2008

(54) TRANSFLECTIVE SWITCHABLE DOUBLE-CELL LCD DEVICE

(75) Inventor: Yusei Ukawa, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 145 days.

(21) Appl. No.: 10/522,846

(22) PCT Filed: Jul. 11, 2003

(86) PCT No.: PCT/IB03/03115

§ 371 (c)(1), (2), (4) Date: Jan. 28, 2005

(87) PCT Pub. No.: WO2004/013687

PCT Pub. Date: Feb. 12, 2004

(65) Prior Publication Data

US 2005/0248697 A1    Nov. 10, 2005

(30) Foreign Application Priority Data

Jul. 30, 2002    (JP) .............................. 2002-220846

(51) Int. Cl.
G02F 1/1335    (2006.01)
(52) U.S. Cl. ............................. 349/114; 349/74; 349/77
(58) Field of Classification Search .................. 349/114, 349/74, 77
See application file for complete search history.

(56) References Cited

U.S. PATENT DOCUMENTS

| | | | |
|---|---|---|---|
| 4,637,687 A | * | 1/1987 | Haim et al. .................... 349/81 |
| 4,693,560 A | | 9/1987 | Wiley |
| 5,796,454 A | | 8/1998 | Ma |
| 6,144,359 A | | 11/2000 | Grave |

FOREIGN PATENT DOCUMENTS

| | | |
|---|---|---|
| CN | 1300954 A | 6/2001 |
| JP | 59017530 | 1/1984 |
| WO | WO97/01789 | 1/1997 |

OTHER PUBLICATIONS

Patent Abstracts of Japan vol. 008, No. 109 (P-275), May 22, 1984.

* cited by examiner

*Primary Examiner*—James A. Dudek
(74) *Attorney, Agent, or Firm*—Birch, Stewart, Kolasch & Birch, LLP

(57) ABSTRACT

To be realized the well-lighted display by using the whole pixels in the reflective mode and the transmissive mode. In a reflective mode, an optical element 13 is used as liquid crystal display element. That is, the optical element 13 operates as liquid crystal display element by applying the voltage. In this case, the optical element 13 reflects the external light since the optical element 13 is a scattering state with regard to non-applying pixel (arrow B). In a transmissive mode, a liquid crystal panel 12 is used as liquid crystal display element. That is, the liquid crystal panel 12 operates as liquid crystal display element by applying the voltage. In this case, the optical element 13 passes light from a backlight 11 since the optical element 13 is a transmissive state (arrow A). And the optical element 13 plays a color filter part and does not operates as display element.

5 Claims, 4 Drawing Sheets

| SW \ Mode | SW1 | SW2 | SW3 |
|---|---|---|---|
| Reflective Mode | ON | OFF | OFF |
| Transmissive Mode | ON | ON | ON |

TRANSFLECTIVE SWITCHABLE DOUBLE-CELL LCD DEVICE

BACKGROUND OF THE INVENTION

1. Field of the Invention

The present invention relates to the transflective liquid crystal display device, particularly to the transflective liquid crystal display device usable the whole pixels in the reflective mode and the transmissive mode.

2. Description of Related Art

So-called transflective liquid crystal display devices have been put into full-scale practical use in which external light incident from a front side is reflected to lead to the front side, while incident light from a rear side due to the backlight system is transmitted to lead to the same front side. The liquid crystal display devices of this type provide effective image display by the external light (ambient light) principally (reflective mode) under well-lighted environments, and by the emitted light in the backlight system principally (transmissive mode) under low light environments.

Such a type of liquid crystal display device is disclosed in a document of the related art of M. Kubo, et al. "Development of Advanced TFT with Good Legibility under Any Intensity of Ambient Light", IDW"99, Proceedings of The Sixth International Display Workshops, AMD3–4, pages 183–186, Dec. 1, 1999, sponsored by ITE and SID".

In this device, each pixel has a reflective region and a transmissive region. The reflective region is provided with, for example, an aluminum reflecting member. The transmissive region is formed by removing part of the reflecting member. For example, the transmissive region is arranged at the center in a rectangular pixel region and has a rectangular shape substantially geometrically similar to the pixel region. The reflective region is a portion of the pixel region except the rectangular transmissive region and has a shape of surrounding the transmissive region.

However, in the above-mentioned transflective liquid crystal display devices, since a single pixel has a transmissive region and a reflective region, there are disadvantages that the transmittance ratio is lower than that in the transmissive type liquid crystal display device, while the reflectivity is lower than that in the reflective type liquid crystal display device. In other words, in terms of luminosity, transflective liquid crystal display devices are unfavorable as compared with transmissive type liquid crystal display devices and reflective type liquid crystal display devices.

In view of the present invention, it is an object of the present invention to provide a transflective liquid crystal display device enabling well-lighted display using the whole pixels in both a reflective mode and transmissive mode.

SUMMARY OF THE INVENTION

The subject matter of the present invention is to realize the well-lighted display with a same level as that in the transmissive type LCD or the reflective type LCD by disposing an optical element, which is capable of switching between transmission of light from a light source and reflection of external light by applying the voltage, between the light source and liquid crystal panel or over the liquid crystal panel, and thereby using the whole pixels in the reflective mode and the transmissive mode of the transflective LCD.

A transflective liquid crystal display device of the present invention is a transflective liquid crystal display device which has a reflective mode using external light and a transmissive mode using a light source, and has a light source used in the transmissive mode, a liquid crystal panel, arranged over the light source, for operating as a display element in the transmissive mode, and an optical element, arranged over the liquid crystal panel, for operating as a display element in the reflective mode.

According to this arrangement, since the optical element, which switches between transmission of light from the light source and reflection of external light by applying the voltage, is arranged over the liquid crystal panel, well-lighted display can be realized in either the transmissive mode or the reflective mode using the whole pixels. In this arrangement, using a polymer type liquid crystal display element as an optical element eliminates the need of a polarizer in the optical element, and therefore, it is possible to perform well-lighted display extremely in the reflective mode.

It is preferable in the transflective liquid crystal display device of the present invention that the optical element passes light from the light source in the transmissive mode and reflects the external light in the reflective mode.

The transflective liquid crystal display device of the present invention is preferably provided with switching control means for switching controlling the power supply such that the liquid crystal panel operates as a display element in the transmissive mode and the optical element operates as a display element in the reflective mode.

It is preferable in the transflective liquid crystal display device of the present invention that the optical element has an arrangement of pixel and has a color filter.

A transflective liquid crystal display device of the present invention is a transflective liquid crystal display device which has a reflective mode using external light and a transmissive mode using a light source, and has a light source used in the transmissive mode, an optical element, arranged over the light source, for passing light from the light source in the transmissive mode and for reflecting the external light in the reflective mode, and a liquid crystal panel, arranged over the optical element, for operating as a display element.

According to this arrangement, since the optical element, which switches between transmission of light from the light source and reflection of external light by applying the voltage, is arranged between the light source and the liquid crystal panel, well-lighted display can be realized in either the transmissive mode or the reflective mode using the whole pixels. In other words, it is possible to deliver optimum performance in both the transmissive mode and the reflective mode.

The transflective liquid crystal display device of the present invention is preferably provided with switching control means for switching controlling the power supply such that light from the light source is passed through the optical element in the transmissive mode and the external light is reflected by the optical element in the reflective mode.

In the transflective liquid crystal display device of the present invention, it is preferable that the optical element has a polymer dispersed type liquid crystal display element or a polymer network type liquid crystal display element.

Further scope of the applicability of the present invention will became apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT(S)

Embodiments of the present invention will be described specifically below with reference to accompanying drawings.

Figure 1:
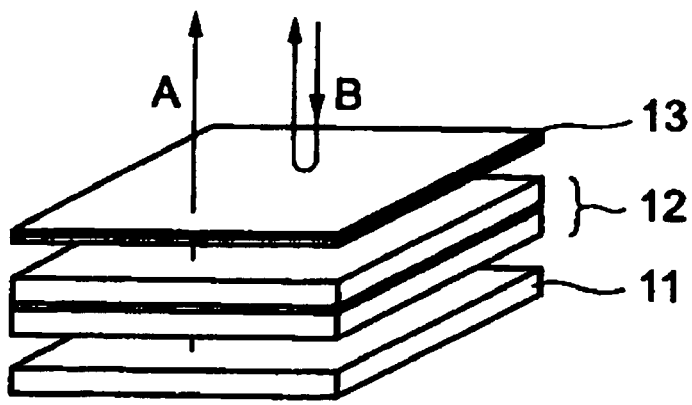
FIG. 1 is a view showing an arrangement of the transflective liquid crystal display device according to Embodiment 1 of the present invention.

This embodiment describes an arrangement where an optical element, which is capable of switching between transmission of light from the light source and reflection of external light by applying the voltage, is arranged over the liquid crystal panel. FIG. 1 is a view showing an arrangement of the transflective liquid crystal display device according to Embodiment 1 of the present invention.

The transflective liquid crystal display device as shown in FIG. 1 principally has a backlight 11 that is the light source used in the transmissive mode, a liquid crystal panel 12, arranged over the backlight 11, for operating as a display element in the transmissive mode, and an optical element 13, arranged over the liquid crystal panel 12, for operating as a display element in the reflective mode.

As the backlight 11, there may be backlights used in general liquid crystal display devices.

Liquid crystal panels used in monochrome transmissive type LCD, for example, TN (Twisted Nematic) liquid crystal panel and STN (Super Twisted Nematic) liquid crystal panel, may be used as the liquid crystal panel 12. Further, an active matrix liquid crystal panel may be used, and thus various types of liquid crystal panels may be used irrespective of liquid crystal type, driving method and alignment mode (for example, VA (Vertical Alignment) and IPS (In Plane switching)). For example, a liquid crystal panel with an arrangement as shown in FIG. 2 may be used as the liquid crystal panel 12.

Figure 2:
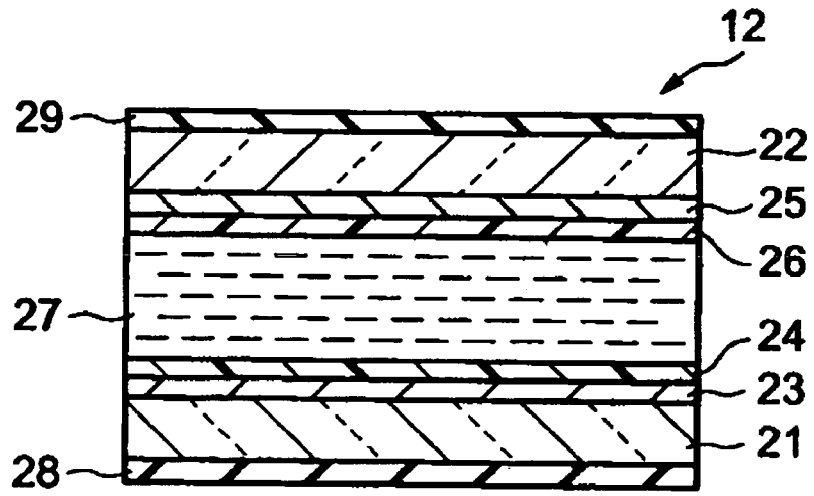
FIG. 2 is a sectional view showing an arrangement of the liquid crystal panel of the transflective liquid crystal display device according to Embodiment 1 of the present invention.

FIG. 2 is a sectional view showing an arrangement of the liquid crystal panel of the transflective liquid crystal display device according to Embodiment 1 of the present invention. A transparent electrode 23 is formed on one main surface of a glass substrate 21 on one side. As materials for the transparent electrode 23, for example, there may be ITO (Indium Tin Oxide), zinc oxide series materials, titanium oxide series materials, indium oxide-zinc oxide series materials, Ga doped zinc oxide series materials, and p-type oxide materials. An alignment film 24 is formed on the transparent electrode 23. As materials for the alignment film 24, there may be resin materials such as polyimide.

As in the glass substrate 21, a transparent electrode 25 is formed on one main surface of a glass substrate 22 on the other side, and an alignment film 26 is formed on the transparent electrode 25. As respective materials for the transparent electrode 25 and alignment film 26, the same materials as in the glass substrate 21 may be used.

In addition, transparent electrodes 23 and 25 respectively on glass substrates 21 and 22 compose matrixes of scanning electrode and signal electrode to enable the display. Further, as methods of forming the transparent electrodes 23 and 25, there may be methods used in manufacturing general liquid crystal display devices such as sputtering, for example. As methods of forming alignment films 24 and 26, there may be methods used in manufacturing general liquid crystal display devices such as methods including processes of coating, drying, and rubbing, for example.

A liquid crystal layer 27 is formed between the glass substrates 21 and 22. The liquid crystal layer 27 is formed by arranging the glass substrates 21 and 22 on which films are formed so that the alignment films 24 and 26 are opposed to each other, and filling a liquid crystal material (herein, TN liquid crystal) between the glass substrates 21 and 22. A polarizer 28 is arranged on the other main surface of the glass substrate 21, and a polarizer 29 is arranged on the other main surface of the glass substrate 22. In addition, while the example is herein described where the polarizer comprised of a single sheet is used, in the present invention it may be possible to use a polarizer comprised of a plurality of sheets including a retardation film and optical film for viewing angle compensation.

A polymer network type liquid crystal display element and polymer dispersed type liquid crystal display element may be used as the optical element 13. For example, it may be possible to use a polymer network type liquid crystal display element with an arrangement as shown in FIG. 3.

Figure 3:
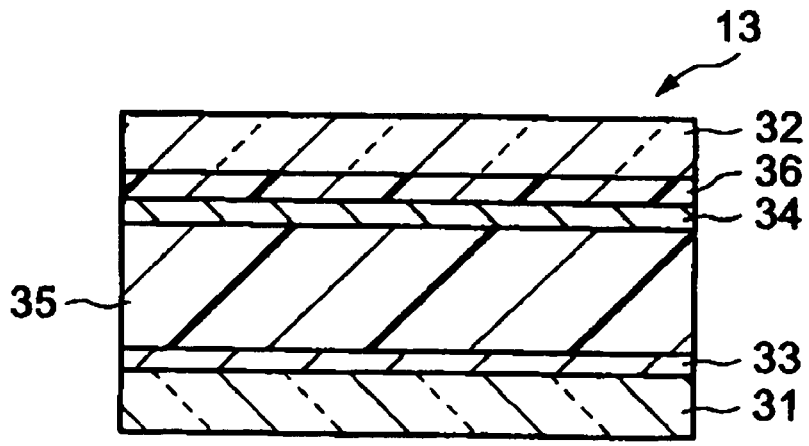
FIG. 3 is a sectional view showing an arrangement of the optical element of the transflective liquid crystal display device according to Embodiment 1 of the present invention.

FIG. 3 is a sectional view showing an arrangement of the optical element of the transflective liquid crystal display device according to Embodiment 1 of the present invention. A transparent electrode 33 is formed on one main surface of a glass substrate 31 on one side. A color filter 36 is formed on one main surface of a glass substrate 32 on the other side. A transparent electrode 34 is formed on the color filter 36. Methods used in manufacturing general liquid crystal display devices may be used as methods of forming the color filter 36 and transparent electrodes 33 and 34. The same materials as those used in the liquid crystal panel 12 may be used as materials for the transparent electrodes 33 and 34, and as methods of forming the electrodes, there may be methods used in manufacturing general liquid crystal display devices. In addition, the transparent electrodes 33 and 34 respectively on glass substrates 31 and 32 compose matrixes of scanning electrode and signal electrode to enable the display.

A polymer liquid crystal layer 35 is formed between the glass substrates 31 and 32. The polymer liquid crystal layer 35 is sandwiched between the glass substrates 31 and 32 arranged so that the transparent electrodes 33 and 34 are opposed to each other. As the polymer liquid crystal layer 35, it may be possible to use a polymer network type liquid crystal where networks containing liquid crystal molecules extend in a polymer matrix and a polymer dispersed type liquid crystal where liquid capsules containing liquid crystal molecules are dispersed in a polymer matrix. In addition, in terms of low driving voltage, the polymer network type liquid crystal is more advantageous.

The liquid crystal panel 12 and optical element 13 are arranged in the order of the backlight 11, liquid crystal panel 12 and optical element 13 as shown in FIG. 1. In this arrangement, the liquid crystal panel 12 is used as a display element in the transmissive mode, and the optical element 13 is used as a display element in the transflective mode.

Figures 4, 5:
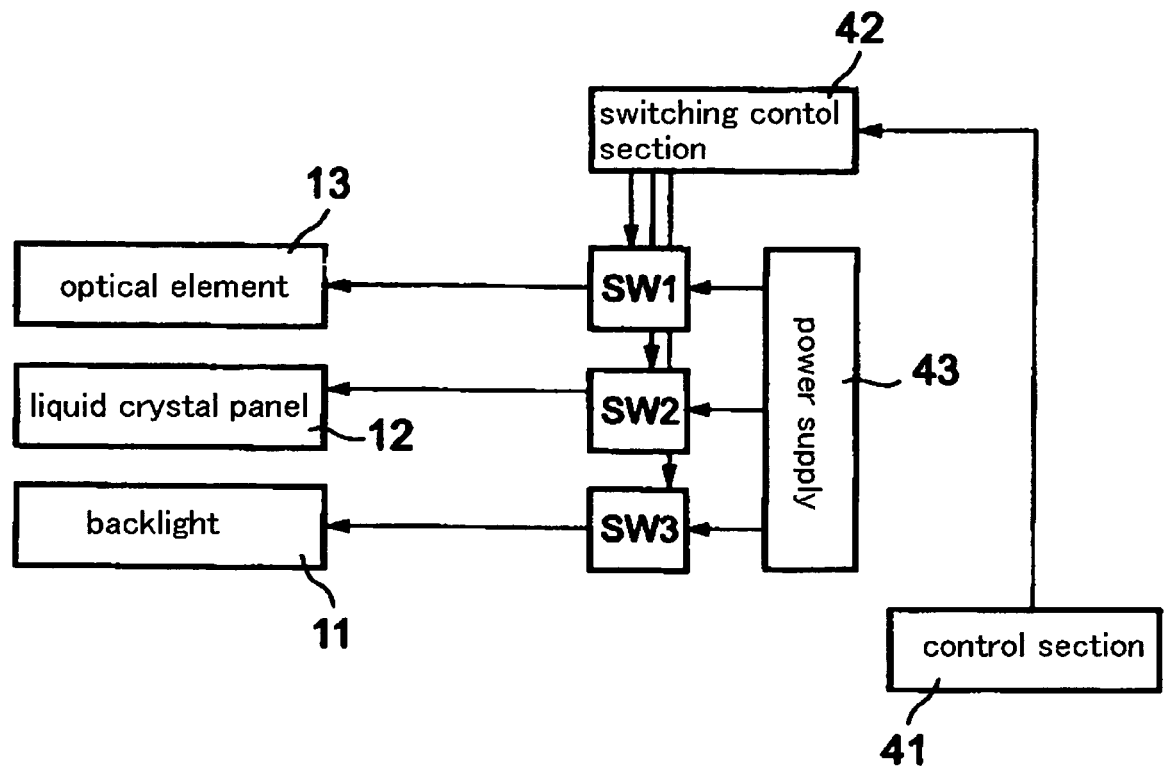
FIG. 4 is a block diagram showing an arrangement of the transflective liquid crystal display device according to Embodiment 1 of the present invention.
FIG. 5 is a view showing a switching table in the transflective liquid crystal display device according to Embodiment 1 of the present invention.

FIG. 4 is a block diagram showing an arrangement of the transflective liquid crystal display device according to Embodiment 1 of the present invention. The arrangement has a control section 41 that controls the entire device, a switching control section 42 that controls switching of application of voltage to the backlight 11, liquid crystal panel 12, and optical element 13, and power supply 43 that supplies the power for the application of voltage. Further, the arrangement has switches SW1 to SW3 to perform switching control. The switching control section 42 has a switching table as shown in FIG. 5, and based on the switching table, performs the switching control.

The operation in the transflective liquid crystal display device with the above-mentioned arrangement according to this embodiment will be described below.

Based on an input from a user or external circumstances (such as luminance and quantity of light), the control section 41 automatically sets a display mode (reflective mode or transmissive mode), and outputs the mode information to the switching control section 42. The switching control section 42 controls switching of power supply to SW1 to SW3 so as to use the optical element 13 as a display element using the external light in the reflective mode, while using the liquid crystal panel 12 as a display element using the light from the backlight 11 in the transmissive mode.

A case of the reflective mode will be described first. In the reflective mode, specifically, as shown in FIG. 5, since the optical element 13 is used as a display element, SW1 is ON. In the reflective mode, since the optical element 13 is used as a display element, the voltage is not applied to the liquid crystal panel 12. Therefore, SW2 is OFF. Further, in the reflective mode, since the external light is used, the power is not supplied to the backlight 11 either. Thus, SW3 is OFF either.

In such a state, the optical element 13 is driven as a general liquid crystal display element. In other words, the power supply 43 supplies the power to apply the voltage to the optical element 13 for the display. In this case, the optical element 13 reflects the external light since the optical element 13 is a scattering state with regard to non-applying pixel (arrow B in FIG. 1).

A case of the transmissive mode will be described next. In the transmissive mode, specifically, as shown in FIG. 5, since the voltage is applied to the optical element 13 to be a transmissive state to pass the external light, SW1 is ON. In the transmissive mode, since the liquid crystal panel 12 is used as a display element, the voltage is applied to the liquid crystal panel 12. Therefore, SW2 is ON also. Further, in the transmissive mode, since the external light is not used, the power is supplied to the backlight 11. Thus, SW3 is ON also.

In such a state, the liquid crystal panel 12 is driven as a general liquid crystal display element. In other words, the power supply 43 supplies the power to apply the voltage to the liquid crystal panel 12 for the display. In this case, the light from the backlight 11 is output to the outside since the optical element 13 is a transmissive state (arrow A in FIG. 1). Further, the optical element 13 plays a role as a color filter and does not operate as a display element.

Thus, in the transflective liquid crystal display device according to Embodiment 1, since the optical element, which switches between transmission of light from the backlight and reflection of external light by applying the voltage, is arranged over the liquid crystal panel, well-lighted display can be realized in either the transmissive mode or the reflective mode using the whole pixels. In other words, it is possible to deliver optimum performance in both the transmissive mode and the reflective mode.

Further, in this arrangement, since the optical element does not require a polarizer, it is possible to perform well-lighted display extremely in the reflective mode. Furthermore, in this embodiment, it is not required to provide a transmissive region (hole) in a pixel, and therefore, it is also possible to simplify manufacturing processes.

While this embodiment describes the arrangement where application of voltage to the optical element 13 is switched, by using an arrangement where the scattering degree is associated with grayscale in a polymer type liquid crystal of the optical element 13, it is possible to realize grayscale display by performing both the reflective display and transmissive display. In this case, the power is supplied to all the optical element, liquid crystal panel and backlight, and the voltage applied to the optical element is controlled. It is thereby possible to control priorities of modes to use in user preferential.

Figure 6:
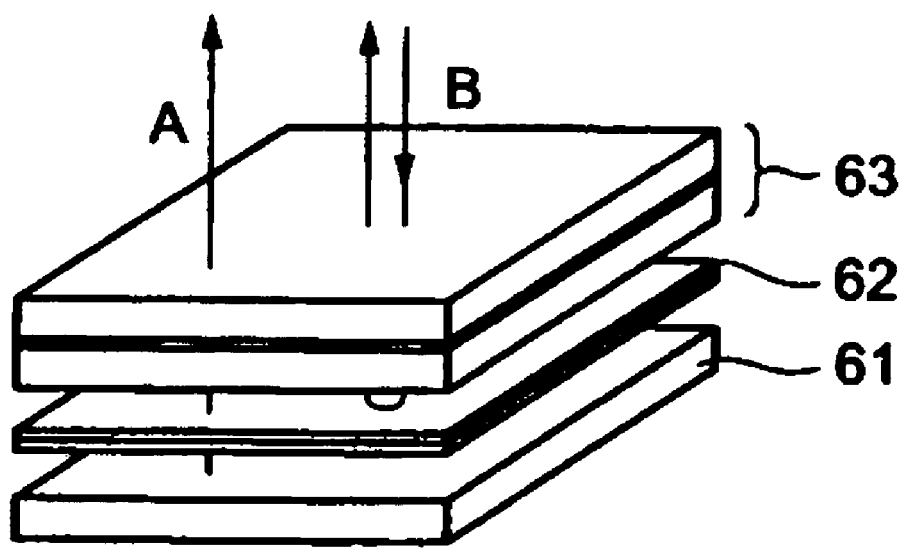
FIG. 6 is a view showing an arrangement of the transflective liquid crystal display device according to Embodiment 2 of the present invention.

This embodiment describes an arrangement where an optical element, which is capable of switching between transmission of light from the light source and reflection of external light by applying the voltage, is arranged between the light source and the liquid crystal panel. FIG. 6 is a view showing an arrangement of the transflective liquid crystal display device according to Embodiment 2 of the present invention.

The transflective liquid crystal display device as shown in FIG. 6 principally has a backlight 61 that is the light source used in the transmissive mode, an optical element 62, arranged over the backlight 61, for switching transmission of the light from the backlight 61 and reflection of the external light by applying the voltage, and a liquid crystal panel 63, arranged over the optical element 62, for operating as a display element in the transmissive mode.

As the backlight 61, there may be backlights used in general liquid crystal display devices.

Liquid crystal panels used in monochrome transmissive type LCD, such as, for example, TN (Twisted Nematic) liquid crystal panel and STN (Super Twisted Nematic) liquid crystal panel, may be used as the liquid crystal panel 63. Further, an active matrix liquid crystal panel may be used, and thus various types of liquid crystal panels may be used irrespective of liquid crystal type, driving method and alignment mode (for example, VA (Vertical Alignment) and IPS (In Plane switching)). For example, a liquid crystal panel with an arrangement as shown in FIG. 7 may be used as the liquid crystal panel 63.

Figure 7:
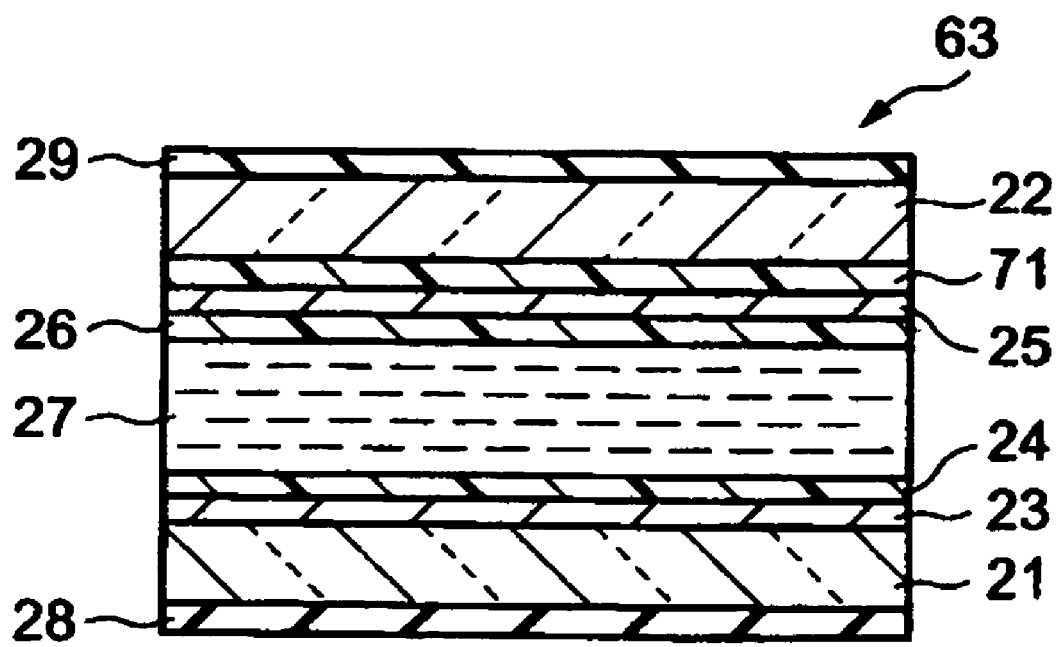
FIG. 7 is a sectional view showing an arrangement of the liquid crystal panel of the transflective liquid crystal display device according to Embodiment 2 of the present invention.

FIG. 7 is a sectional view showing an arrangement of the liquid crystal panel of the transflective liquid crystal display device according to Embodiment 2 of the present invention. In addition, in FIG. 7, the same portions as in FIG. 2 are assigned the same reference numerals as in FIG. 2 and specific descriptions thereof are omitted.

The transparent electrode 23 and alignment film 24 are successively formed on one main surface of one side of the glass substrate 21. A color filter 71 is formed on one main surface of the other side of the glass substrate 22, and as in the glass substrate 21, the transparent electrode 25 and alignment film 26 are formed on the filter 71 successively. The same materials as in Embodiment 1 may be used as materials for each of the transparent electrode 25, alignment film 26 and color filter 71.

In addition, the transparent electrodes 23 and 25 respectively on the glass substrates 21 and 22 compose matrixes of scanning electrode and signal electrode to enable the display. Further, the same methods as in Embodiment 1 may be used as methods of forming the transparent electrodes 23 and 25, methods of forming the alignment films 24 and 26 and method of forming the color filter 71.

The liquid crystal layer 27 is formed between the glass substrates 21 and 22. The liquid crystal layer 27 is formed by arranging the glass substrates 21 and 22 on which films are formed so that alignment films 24 and 26 are opposed to each other, and filling a liquid crystal material (herein, TN liquid crystal) between the glass substrates 21 and 22. The polarizer 28 is arranged on the other main surface of the glass substrate 21, and the polarizer 29 is arranged on the other main surface of the glass substrate 22. In addition, while the example is herein described where the polarizer comprised of a single sheet is used, in the present invention it may be possible to use a polarizer comprised of a plurality of sheets including a retardation film and optical film for viewing angle compensation.

A polymer network type liquid crystal display element and polymer dispersed type liquid crystal display element may be used as the optical element 62. For example, it may be possible to use the polymer network type liquid crystal display element with an arrangement as shown in FIG. 8.

Figure 8:
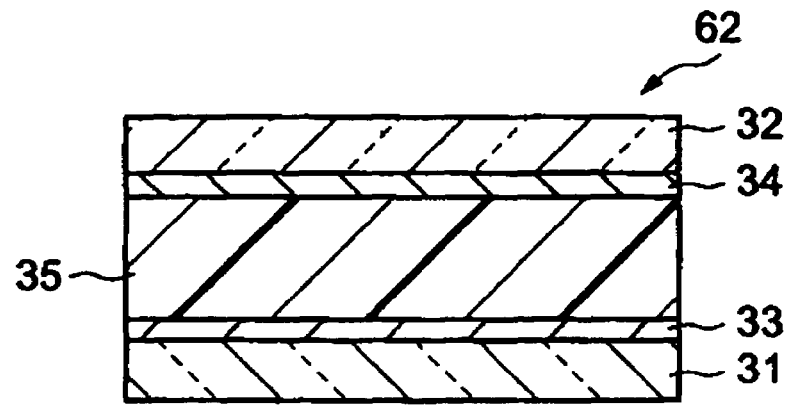
FIG. 8 is a sectional view showing an arrangement of the optical element of the transflective liquid crystal display device according to Embodiment 2 of the present invention.

FIG. 8 is a sectional view showing an arrangement of the optical element of the transflective liquid crystal display device according to Embodiment 2 of the present invention. The transparent electrode 33 is formed on one main surface of one side of the glass substrate 31. The transparent electrode 34 is formed on one main surface of the other side of the glass substrate 34. The same materials as those used in the liquid crystal panel 63 may be used as materials for the transparent electrodes 33 and 34, and as methods of forming the electrodes, there may be methods used in manufacturing general liquid crystal display devices. In addition, in the arrangement, since the transparent electrodes 33 and 34 respectively on the glass substrates 31 and 32 do not need to compose matrixes of scanning electrode and signal electrode, the need of patterning is eliminated in a display region with regard to the transparent electrodes formed on the optical element 62, and further, positioning is not required in assembling the liquid crystal panel 63, thus enabling simplified processes.

The polymer liquid crystal layer 35 is formed between the glass substrates 31 and 32. The polymer liquid crystal layer 35 is sandwiched between the glass substrates 31 and 32 arranged so that the transparent electrodes 33 and 34 are opposed to each other. As the polymer liquid crystal layer 35, it may be possible to use a polymer network type liquid crystal where networks containing liquid crystal molecules extend in a polymer matrix and a polymer dispersed type liquid crystal where liquid capsules containing liquid crystal molecules are dispersed in a polymer matrix. In addition, in terms of low driving voltage, the polymer network liquid crystal is more advantageous.

The liquid crystal panel 63 and optical element 62 are arranged in the order of the backlight 61, optical element 62 and liquid crystal panel 63 as shown in FIG. 6. This arrangement uses light from the backlight 61 in the transmissive mode, while using the external light in the transflective mode. Therefore, the switching control is performed such that the optical element 62 is the transmissive state in the transmissive mode, while being the scattering state in the reflective mode.

Figure 9:
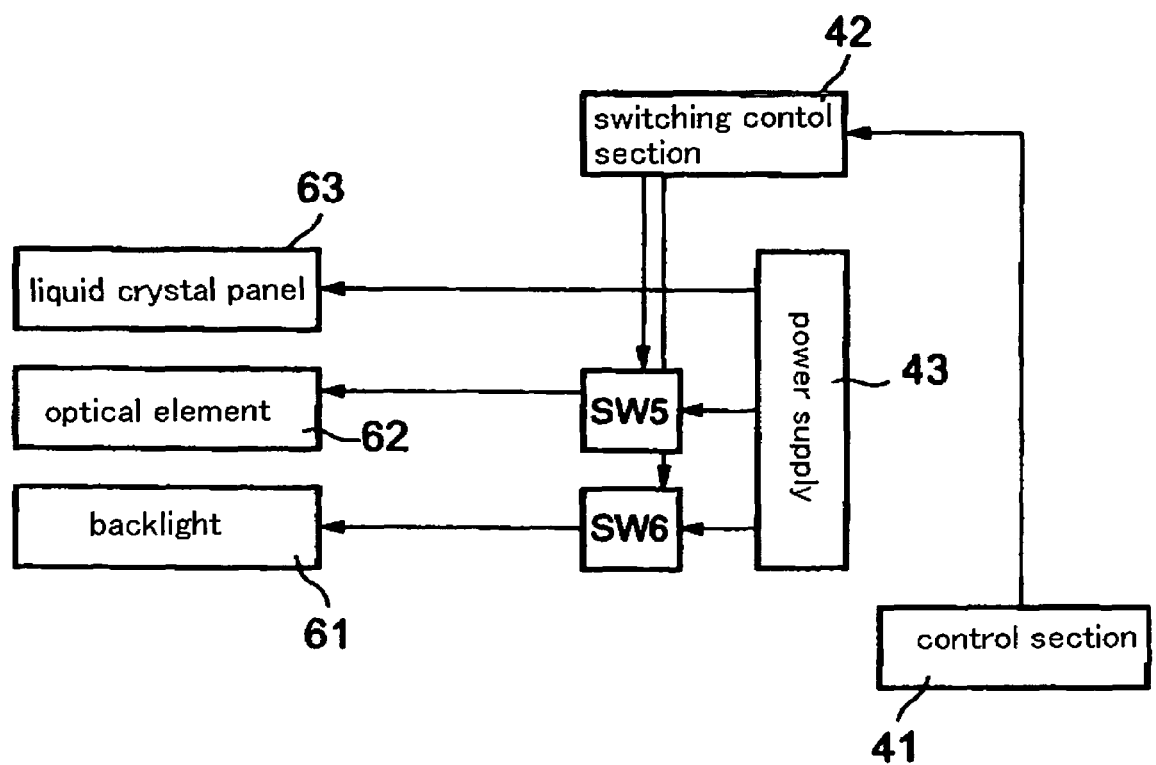
FIG. 9 is a block diagram showing an arrangement of the transflective liquid crystal display device according to Embodiment 2 of the present invention.

FIG. 9 is a block diagram showing an arrangement of the transflective liquid crystal display device according to Embodiment 2 of the present invention. The arrangement has the control section 41 that controls the entire device, switching control section 42 that controls switching of application of voltage to the backlight 61 and optical element 62, and power supply 43 that supplies the power for the application of voltage. Further, the arrangement has switches SW5 and SW6 to perform switching control.

The operation in the transflective liquid crystal display device with the above-mentioned arrangement according to this embodiment will be described below.

Based on an input from a user or external circumstances (such as luminance and quantity of light), the control section 41 automatically sets a display mode (reflective mode or transmissive mode), and outputs the mode information to switching control section 42. The switching control section 42 controls switching of power supply to SW5 and SW6 so as to use the light from the backlight 61 in the transmissive mode, while using the external light in the reflective mode.

A case of the reflective mode will be described first. In the reflective mode, since the optical element 62 is used as a reflector, SW5 is OFF (scattering state). In the reflective mode, since the external light is used, the power is not supplied to the backlight 61. Thus, SW6 is OFF either.

In such a state, the external light is passed through the liquid crystal panel 63, reflected by the optical element 62 of the scattering state, passed through the liquid crystal panel 63 again and then output to the outside (arrow B in FIG. 6). The liquid crystal panel 63 operates as a liquid crystal display element. In other words, the power supply 43 supplies the power to apply the voltage to the liquid crystal panel 63 for the display.

A case of the transmissive mode will be described next. In the transmissive mode, since the optical element 62 passes the light from the backlight 61, SW5 is ON (transmissive state). In the transmissive mode, since the light from the backlight 61 is used, the power is supplied to the backlight 61. Therefore, SW6 is ON also.

In such a state, the light from the backlight 61 is output to the outside through the optical element 62 of the transmissive state and liquid crystal panel 63 (arrow A in FIG. 6). The liquid crystal panel 63 operates as a liquid crystal display element. In other words, the power supply 43 supplies the power to apply the voltage to the liquid crystal panel 63 for the display.

Thus, in the transflective liquid crystal display device according to Embodiment 2, since the optical element, which switches between transmission of light from the backlight and reflection of external light by applying the voltage, is arranged between the backlight and liquid crystal panel, well-lighted display can be realized in either the transmissive mode or the reflective mode using the whole pixels. In other words, it is possible to deliver optimum performance in both the transmissive mode and the reflective mode. Further, in this embodiment, it is not required to provide a transmissive region (hole) in a pixel, thereby enabling simplified manufacturing processes.

This embodiment describes the arrangement where the optical element is arranged between the liquid crystal panel and backlight, and further, the present invention allows an arrangement where an optical element is incorporated into a liquid crystal panel such that the optical element is arranged between a liquid crystal layer and backlight.

While this embodiment describes the arrangement where application of voltage to the optical element 62 is switched, by using an arrangement where the scattering degree is associated with grayscale in a polymer liquid crystal of the optical element 62, it is possible to realize grayscale display by performing both the reflective display and transmissive display. In this case, the power is applied to all the optical element, liquid crystal panel and backlight, and the voltage applied to the optical element is controlled. It is thereby possible to control priorities of modes to use in user preferential.

The present invention is not limited to above-mentioned Embodiments 1 and 2, and is capable of being carried into practice with various modifications thereof. For example, while Embodiments 1 and 2 describe the case of using a passive type liquid crystal display element as a liquid crystal panel and optical element used as a display element, the present invention allows the use of an active matrix type liquid crystal display element.

Further, while Embodiments 1 and 2 describe the case of using a polymer network type liquid crystal display element as an optical element, the present invention is capable of being applied to a case of using a polymer dispersed type liquid crystal display element. Furthermore, an optical element that electrically controls switching between its states where light is passed through and where light is reflected may be used as an optical element in the present invention, as well as optical elements using a polymer network type liquid crystal display element or polymer dispersed type liquid crystal display element.

Moreover, while Embodiments 1 and 2 respectively describe the case of using the optical element 13 or 62 with the polymer liquid crystal layer 35 sandwiched between glass substrates, the present invention is capable of being applied to a case where the optical element 13 or 62 is a film without using glass substrates. This case enables the optical element to be bonded to the liquid crystal panel, and thus allows simplified manufacturing processes.

The present invention enables adequately well-lighted display in both modes, transmissive mode and reflective mode, and therefore, is capable of being applied to liquid crystal display devices such as cellular telephones and PDA (Portable Digital Assistant) used in external environments.

As described above, since the transflective liquid crystal display device of the present invention has an optical element, which switches between transmission of light from the light source and reflection of external light by applying the voltage, is arranged between a light source and liquid crystal panel or over a liquid crystal panel, well-lighted display can be realized in either the transmissive mode or reflective mode using the whole pixels.

This application is based on the Japanese Patent Application No 2002-220846 filed on Jul. 30, 2002, entire content of which is expressly incorporated by reference herein.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A transflective liquid crystal display device with a reflective mode using external light and a transmissive mode using a light source, comprising:
    a light source for use in the transmissive mode;
    a liquid crystal panel, arranged over said light source, operating as a first display element in the transmissive mode and being turned off in the reflective mode; and
    an optical element comprising an arrangement of pixels and a color filter, over said liquid crystal panel, for operating as a second display element in the reflective mode without using a transflector and for operating as a color filtering unit in the transmissive mode.

2. The transflective liquid crystal display device according to claim 1, wherein said optical element passes light from said light source in the transmissive mode and reflects said external light in the reflective mode.

3. The transflective liquid crystal display device according to claim 1, further comprising switching control means for switching control of the power supply such that said liquid crystal panel and said light source are turned on in the transmissive mode and turned off in the reflective mode.

4. The transflective liquid crystal display device according to claim 1, wherein said optical element is full-transmissive in the transmissive mode.

5. The transflective liquid crystal display device according to claim 1, wherein said optical element has a polymer dispersed type liquid crystal display element or a polymer network type liquid crystal display element.

* * * * *